United States Patent [19]

Bamji et al.

[11] Patent Number: 4,589,637

[45] Date of Patent: May 20, 1986

[54] APPARATUS FOR MELTING SCRAP METAL AND INGESTION OF SOLIDS IN MOLTEN METAL

[75] Inventors: Pervez J. F. Bamji, Kingston, Canada; John F. Evans, Oswego, N.Y.; Nigel P. Fitzpatrick, Kingston, Canada

[73] Assignee: Alcan International Limited, Montreal, Canada

[21] Appl. No.: 593,717

[22] Filed: Mar. 26, 1984

[30] Foreign Application Priority Data

Mar. 28, 1983 [GB] United Kingdom ............... 8308449

[51] Int. Cl.⁴ .............................................. H05B 6/20
[52] U.S. Cl. ................................... 266/234; 266/901; 373/161
[58] Field of Search ............... 266/209, 234, 901, 237; 373/146, 163, 161

[56] References Cited

U.S. PATENT DOCUMENTS

| | | | |
|---|---|---|---|
| 3,572,671 | 3/1971 | Worner | 266/234 |
| 4,007,036 | 2/1977 | Gottschol et al. | 75/65 R |
| 4,286,985 | 9/1981 | Van Linden et al. | 75/65 R |
| 4,375,885 | 3/1983 | Shigihara et al. | 266/237 |
| 4,487,401 | 12/1984 | Vives | 75/68 R |

FOREIGN PATENT DOCUMENTS 2102747 8/1972 Fed. Rep. of Germany .
2280284 2/1976 France .

Primary Examiner—Melvyn J. Andrews
Attorney, Agent, or Firm—Cooper, Dunham, Clark, Griffin & Moran

[57] ABSTRACT

Solid scrap metal particles are ingested into molten metal by use of a linear induction motor which establishes a strong upstream in the molten metal adjacent one boundary wall to establish a standing wave at the surface and a corresponding downstream adjacent the opposite boundary, which is preferably in the form of a baffle having a metal outlet passage beneath it.

The linear induction motor is conveniently positioned at a sidewell of a melting furnace and a continuous flow of molten metal through the sidewell is established in any convenient way.

7 Claims, 5 Drawing Figures

APPARATUS FOR MELTING SCRAP METAL AND INGESTION OF SOLIDS IN MOLTEN METAL

The present invention relates to the ingestion of solid materials into molten metal.

It is particularly, but not exclusively directed to the melting of light metal scrap, e.g. aluminium (including aluminium alloy) scrap by ingestion into a body of the corresponding molten metal, e.g. molten aluminium.

Large quantities of light gauge aluminium scrap are generated in the production of aluminium beverage cans and can ends and increasing quantities of scrap arise from the collection of used beverage cans for recycling. The efficient and economical recovery of aluminium from these sources is therefore a matter of growing interest.

Large quantities of scalper chips also arise in machining aluminium. This form of scrap usually has a higher bulk density than the forms of aluminium scrap mentioned above.

In most forms of melting furnace for the recovery of scrap, the solid scrap is charged to a body of molten metal held in an enclosed chamber in a reverberatory furnace in which heat is supplied to the molten metal from above. In most instances the heat input is achieved by burning liquid or gaseous fuel in the melting furnace. Thus when any form of scrap, having a high surface area, is charged to the melting furnace it is directly exposed to the high temperature and oxidising conditions in the furnace chamber and relatively high melt losses through oxidation can result.

It is well known that in all forms of scrap melting furnace melt losses can be reduced by submerging the solid scrap as rapidly as possible in the molten metal. However light gauge scrap, either loose or in baled form, tends to float on the molten metal by reason of air entrapment and/or failure of the molten metal to wet it.

It is already known that the ingestion of light metal fragments into molten metal can be assisted by establishing a vigorous circulation in the molten metal. Such vigorous circulation with strong local down-flows may be achieved in a coreless induction furnace, for example. However a coreless induction furnace is relatively inefficient in its use of energy.

It is an object of the invention to provide a means for achieving accelerated ingestion of light gauge scrap metal fragments (including chips, turnings and the like) in molten metal irrespective of the manner in which heat is supplied to it. Thus in the system of the present invention heat may be supplied in a conventional manner, for example, in a reverberatory furnace or the like. Alternatively heat may be supplied by relatively efficient channel-type induction heaters.

It is already known in U.S. Pat. No. 4,286,985 to draw a continuous stream of molten metal from a melting furnace and supply it to a vessel in which a vortex is generated, into which the solid scrap is fed for ease of ingestion. However such a system requires a quite rapid flow of molten metal into the vessel to generate a deep vortex and consequently a metal pump of large size and cost in relation to the quantity of solid scrap ingested, is required. Molten metal pumps have moving parts in contact with molten metal and are therefore prone to high maintenance costs.

In the system of the present invention light metal scrap is ingested into a body of molten metal which is essentially stationary (except for local circulation) in a furnace or which may be flowing at relatively modest linear speed through a trough or like structure. The ingestion of solid metal is achieved by establishing a strong upflow of molten metal in the region of a boundary wall by means of a moving magnetic field device so as to establish a standing wave at the metal surface, confining the molten metal opposite the moving magnetic field device to establish a correspondingly strong down-flow and feeding the solid metal particles onto the surface of the molten metal, preferably between the crest of the standing wave and the opposite boundary of the molten metal. The opposite boundary of the body of molten metal in the region of the moving magnetic field device, such as a so-called linear induction motor, is preferably in the form of a baffle, which does not extend to the bottom of the chamber or trough in which it is located. This allows the solid material to be drawn down into the molten metal and pass out laterally beneath the baffle.

In another variant a stream of molten metal may pass through a trough structure with linear motors arranged in a vertical position adjacent both side walls so as to establish two standing wave humps, between which the scrap is deposited. In this variation each standing wave may be considered as a boundary for the other.

It is estimated that the metal down-flow adjacent the opposite boundary (opposite wall of the trough or chamber or opposed baffle or standing wave) should be not less than about 60 cms/sec. in order to achieve ingestion and submergence of scrap fragments at a satisfactory rate.

The standing wave surface should lie at a relatively small angle to the opposite boundary so as to form a pocket to receive the charged solid scrap. Very conveniently the height of the standing wave equals or even exceeds the distance between the lateral boundaries of the body of metal in which the linear motor or the like is maintaining upward movement.

The spacing between the opposed boundaries of the body of molten metal may have very considerable effects on the efficiency of the submersion achieved, as judged by rate of submergence achieved against energy consumed.

In a system designed to accept a wide range of scrap materials the spacing between the motor and the opposite boundary wall should be sufficiently large to avoid bridging of the molten metal by a layer of large-particle scrap (such as flattened beverage cans). Subject to that practical requirement the spacing between the motor and the opposite boundary should not be such as to prevent the formation of the standing wave and strong downflow of metal. Where submergence is effected in a chamber having transverse walls, the distance between such walls is preferably equal to or less than the active width of the linear induction motor.

The moving magnetic field device may be a linear motor having either distributed windings or it may be a salient pole type of machine. The length of the motor should be such that the regions of optimum magnetic fields are always interfacing the molten metal i.e. the so-called edge effects lie outside the molten metal boundaries. By the same token the width of the machine should be such as to have optimum effect on the molten metal. The moving magnetic field device may either be air-or water-cooled and its windings can be designed so as to be selectively switched i.e. distinct portions of the linear motor can be energized to suit the varying levels of metal. Additionally the moving magnetic field device or certain parts of it can be embedded in the refractory wall between it and the molten metal.

Experiments have shown that the arrangement of the linear motor in relation to the molten metal exerts a substantial influence on the optimum performance. To achieve optimum performance the location and dimensions of the linear motor should be such that the whole depth of the molten metal lies within the active length of the linear motor (that portion of the linear motor where the flux density is uniform). Preferably the linear motor extends at least one and a half pole pitches above and below the molten metal.

In early experiments we have found that in an apparatus in which the spacing between the opposed boundaries was about 18 cms. it was possible to add Al scrap fragments (scalper chips) of density around 400 kg/m$^3$ at the rate of 15–26 kgs/min. and secure their submergence and melting in molten aluminium metal at a maximum power input of 10–12 kVA to the linear motor.

The linear motor employed was 68.6 cm long (in the vertical direction) and 27.9 cm wide (active stator dimensions) having 30 slots for housing the conductors (20 per slot). The pole pitch of the motor was approximately 12.7 cm. and the motor was rated at 45 Amperes, 125 V, 3-phase, 60 Hz.

For optimum results the thickness of the refractory is maintained at the lowest thickness consistent with avoidance of overheating the motor. In some instances it may be preferred to cool the motor by means of liquid coolant.

In our experimental work the metal upon which the linear motor was acting was confined at a distance of 2.5 cms. from the poles of the linear motor by a body of refractory. The efficiency of the motor decreases as the thickness of the refractory is increased, but the motor must be protected against excessive temperature conditions.

One way to maintain efficiency of the motor even at large refractory thickness is to decrease the frequency of the electric supply down to 15–5 Hz or even lower.

The efficiency of the ingestion also varies with the character (particularly the bulk density and particle size) of the scrap material itself. Thus when the scrap consists of decoated and folded beverage cans, (low bulk density and large particle size) the uptake of metal is less efficient than when it consists of scalper chips (relatively high bulk density and small particle size) or shredded decoated can scrap (relatively small particle size in relation to folded beverage cans).

On one example molten metal from a furnace was circulated through a trough structure at a rate of about 27 kgs/min. and scrap in the form of scalper chips was fed to it at a maximum rate of about 20 kgs/min. The temperature of the metal on entering the trough was in the range of 750°–825° C. Melting of the supplied scrap was achieved and the dross produced in the melting trough was only about 1% of the total weight of metal supplied.

In the above quoted example the bottom margin of the refractory baffle placed opposite the linear motor was spaced at a distance of 5 cms. from the bottom of the trough. Preferably this spacing is maintained at a distance in the range of 5 to 25 cms.

In one instance the linear speed of metal through the trough at the metal scrap feed station was of the order of 60 cms/sec.

Preferably the linear motor is mounted on the side of an enlarged portion of a trough or a sidewell of a melting furnace constituting a scrap charging station. Preferably the whole of the metal in the scrap charging station in the longitudinal metal flow direction through such station lies within the active width of the linear motor.

Although the invention has been described with reference to flow of metal through a trough structure, the linear motor may be placed to act on a body of metal located in a sidewell of a melting furnace and confined between the wall of the sidewell and an adjacent baffle. In such case it is not always necessary for there to be a longitudinal metal flow; that is to say in a direction transverse to the length of the linear motor.

The moving magnetic field device need not be rectilinear but can in some circumstances be curved. It is also possible to arrange a linear magnetic field device at some inclination other than vertical. It can be arranged so as to impart a horizontal component to the movement of the upflowing metal. Indeed in some instances the linear motor may be placed horizontally over the molten metal to create a standing wave close to the baffle wall.

As already indicated the moving magnetic field device (linear motor) is located with its poles as close as possible to the molten metal. Thus it may be desirable to locate the linear motor within the refractory wall of a trough or furnace sidewell within a protective casing, in which it is subjected to strong cooling to protect the insulation of the coils.

In the accompanying drawings

Figure 1:
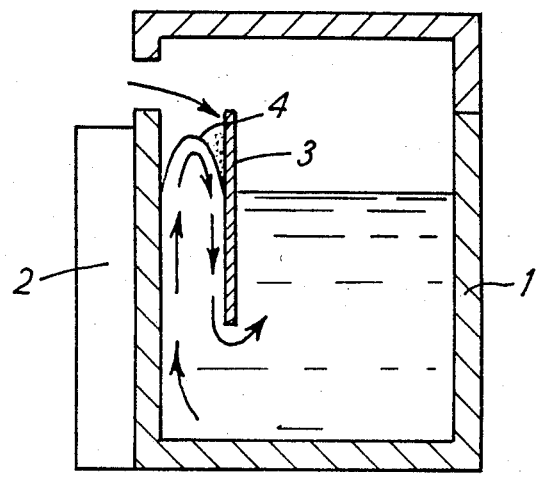
FIG. 1 illustrates the principles of the invention.

In the apparatus illustrated in FIG. 1 a stream of molten metal flows through the refractory lined trough 1. A linear motor 2 is arranged vertically opposite a baffle 3 to establish a standing wave hump 4 on the surface of the molten metal. Scrap is fed onto the surface of the molten metal between the crest of the wave and the baffle 3 and is drawn down into the down-flowing metal adjacent the baffle 3.

It is a further advantage of the system of the present invention that the direction of thrust of the linear motor may be reversed. It can then be employed periodically to apply a stirring action and for flushing away any sub-surface blockages at the charging zone. This is very convenient since it can be done at the flick of a switch.

Figure 2:
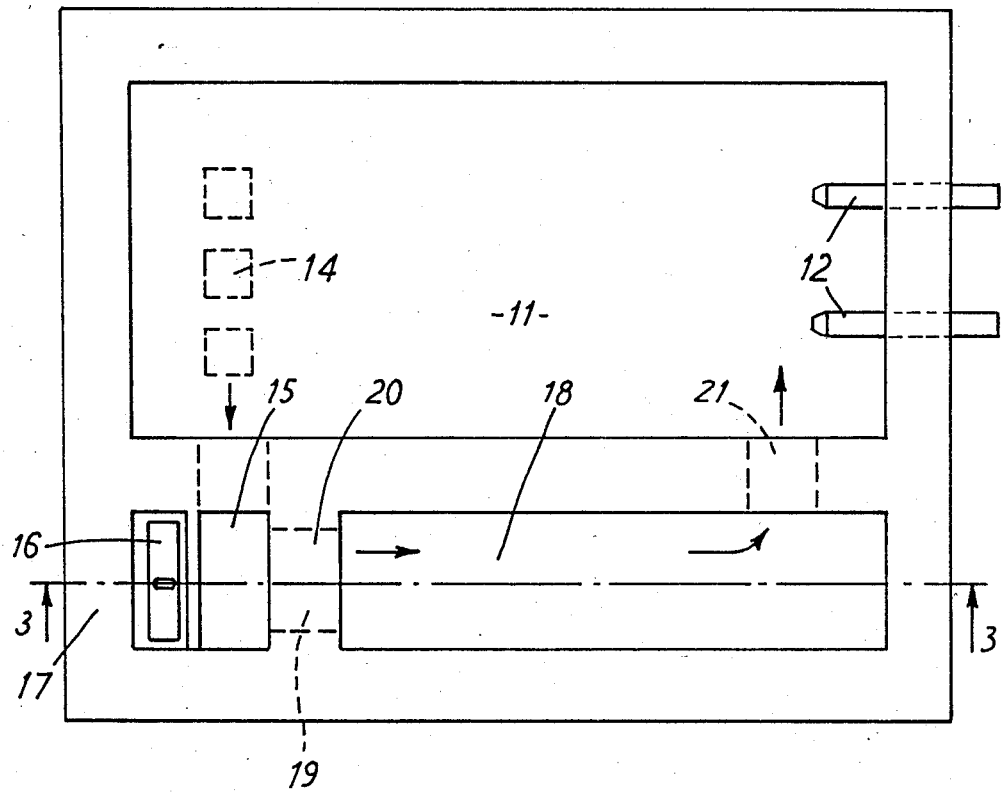
FIG. 2 is a plan view of one form of melting furnace equipped with a metal submergence system in accordance with the invention.

The metal submergence system of the invention is very conveniently built into a melting furnace. The construction illustrated in FIGS. 2 and 3 comprises a main hearth chamber 11, in which a charge of molten metal is heated either by burners 12 or by means of a jet-flow channel-type induction heater 14.

The hearth chamber 11 communicates with a submergence chamber 15. A linear induction motor 16 is built into the thermal insulation 17 of the furnace. The submergence chamber 15 communicates with a sidewell 18 by means of a passage 19 under a baffle wall 20.

Figure 3:
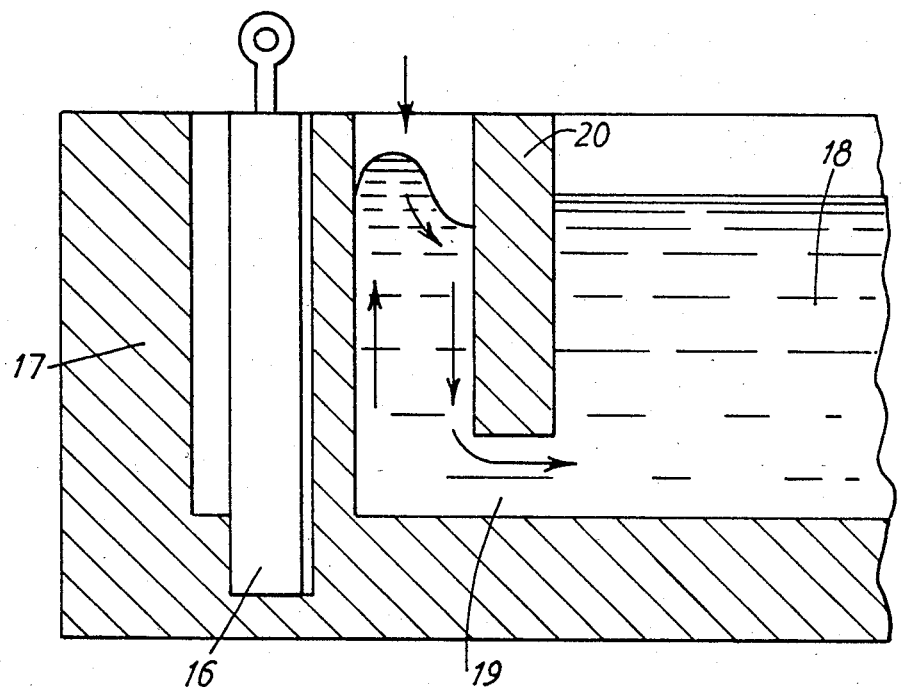
FIG. 3 is a vertical section on line 3—3 of FIG. 2.

As shown in FIG. 3 the molten metal from the main hearth chamber flows into the submergence chamber 15. Solid scrap is fed into the top of the submergence chamber onto the top of the molten metal and the molten metal, augmented by the charge of solid scrap flows through the passage 19 into the sidewell 18, where dross may be skimmed from the metal in a conventional manner. Molten metal is recirculated to the main hearth chamber via passage 21, which lies below the level of the molten metal in the sidewell so that dross accumulates in the sidewell and may be removed at convenient intervals.

Figure 4:
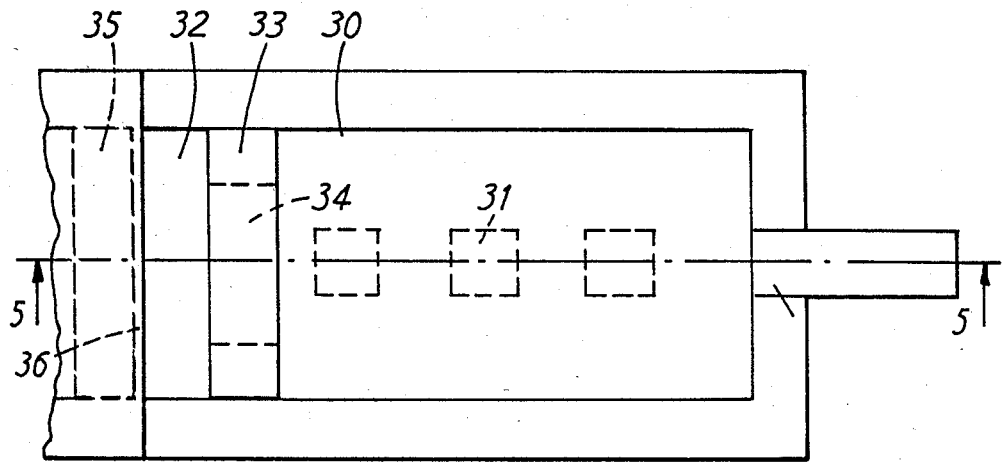
FIG. 4 is a plan view of an alternative form of melting furnace arrangement.
Figure 5:
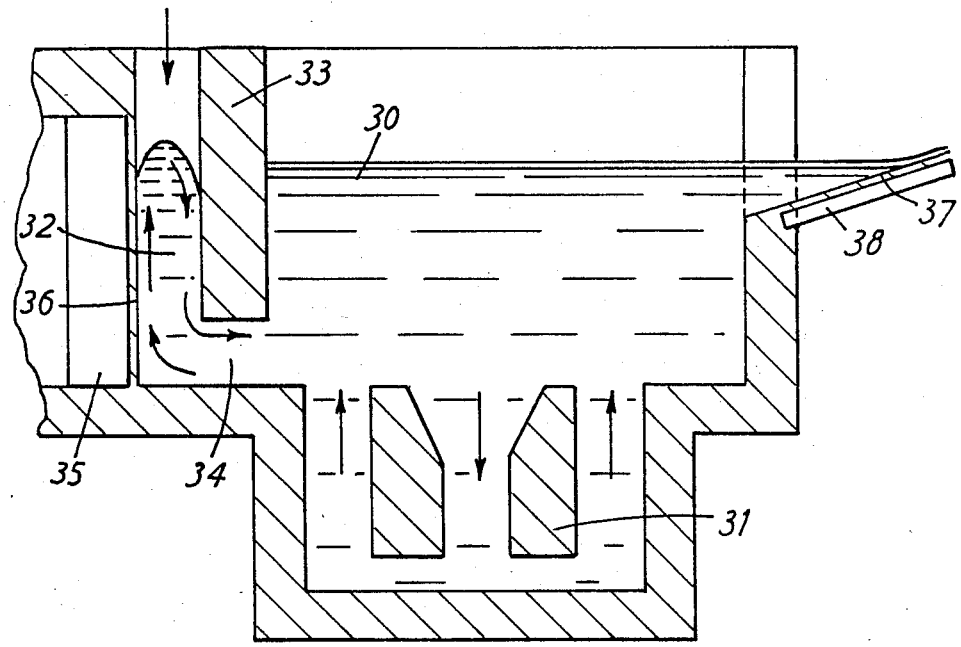
FIG. 5 is a section on line 5—5 of FIG. 4.

The furnace system illustrated in FIGS. 4 and 5 is intended as a melting system, through which there is a continuous flow of metal. It comprises a main melting chamber 30, in which a channel-type induction heater 31 is located and supplies the heat energy for melting solid scrap.

The main melting chamber 30 is separated from a submergence chamber 32 by a baffle 33, the chamber 30 and chamber 32 communicating with each other by a passage 34, which is of sufficient vertical dimension to allow passage of molten metal in both flow and return directions under the influence of a linear induction motor 35, separated from the molten metal in the chamber 32 by a layer 36 of thermal insulation.

At the opposite end of the main melting chamber 30 a stream of molten metal is removed by a conventional overflow system or in some instances by means of an inclined trough 37, up which molten metal is caused to travel by a linear induction motor 38. In consequence of this arrangement there is a circulation of hot metal through the submergence zone as indicated by the flow arrows and this draws solid scrap, fed onto the metal in the submergence chamber 32, downwardly with the molten metal returning to the chamber 30.

A continuous flow of molten metal is drawn off over the upwardly inclined trough 37. Most or all of the dross is left behind on the surface of the metal in the chamber 30, from where it may be skimmed off at convenient intervals.

The channel-type induction heaters 14 and 31 may be of the type described in U.S. Pat. No. 3,595,979 (Ajax Magnethermic Corporation).

We claim:

1. An apparatus for melting scrap metal comprising a main metal melting chamber, means for supplying heat energy to molten metal in said main melting chamber, a solid metal particle submergence chamber in communication with said main melting chamber for passage of molten metal from said main melting chamber to said submergence chamber, a moving magnetic field device located adjacent one boundary wall of said submergence chamber, a baffle located opposite said one wall and having a passage for molten metal beneath its bottom margin, said moving magnetic field device being adapted to establish a strong upflow and standing wave in said molten metal adjacent said one wall and a strong downflow adjacent said baffle.

2. An apparatus according to claim 1 in which said main melting chamber communicates with said submergence chamber at one end thereof.

3. An apparatus according to claim 1 in which said baffle lies between said submergence chamber and a dross collection chamber.

4. An apparatus according to claim 3 in which a part of said dross collection chamber constitutes the main melting chamber and has a channel-type induction heater located therein for supply of heat to molten metal located in said main melting chamber.

5. An apparatus according to claim 4, further including an upward trough overflow for continuous removal of metal from said main melting chamber.

6. An apparatus according to claim 5 further including a magnetic moving field device located beneath said trough for driving molten metal upwardly along said trough.

7. An apparatus for melting scrap metal including a main melting chamber, a channel-type induction heater located therein and positioned for supply of heat to molten metal located in said chamber, a solid metal particle submergence chamber located adjacent one boundary of said main melting chamber, said melting chamber and said submergence chamber being separated from each other by means of a baffle wall, the bottom margin of which is located at a distance above the bottom of said main melting chamber and said solid particle submergence chamber to allow metal flow between said chambers, a moving magnetic field device arranged behind a boundary wall opposite said baffle said moving magnetic field device being arranged to establish a strong metal upflow and standing wave adjacent said boundary wall, said boundary wall and said baffle being arranged at such distance that said metal upflow and standing wave establish a strong metal downflow adjacent said baffle for submergence of metal particles fed onto the surface of molten metal in said submergence chamber, said main melting chamber including means for withdrawing a stream of molten metal therefrom.

* * * * *